Patented Nov. 26, 1940

2,222,945

UNITED STATES PATENT OFFICE 2,222,945

PROCESS AND COMPOSITION FOR COLORING AGGREGATE MATERIALS

Thomas F. Groll, Jr., Elizabeth, N. J., and George H. Small, Atlanta, Ga., assignors to National Oil Products Company, Harrison, N. J., a corporation of New Jersey No Drawing. Application June 28, 1938, Serial No. 216,304

13 Claims. (Cl. 44—6)

The invention relates in general to the coloring of bulk aggregate materials, and in particular to a process of imparting to solid fuels and other aggregate materials identifying coloring and dust laying properties and to correlated improvements in compositions for carrying out such a process.

Heretofore, various methods of applying coloring matter to solid fuels, such as coal, coke and the like have been proposed. The purpose of coloring such materials is, of course, to enable a dealer to attach physically a trade-mark to his product in specie. While these prior proposals have enjoyed some success, difficulty has been encountered in properly or effectively anchoring the coloring matter to the aggregate. Coal, for example, usually possesses a slick and smooth surface, thus rendering the adherence of coloring matter very difficult. Moreover, in those cases where suspended or emulsified coloring matter is applied, the consistency of the composition has been too low, thus lending further difficulties to the process of application.

The general object of the invention is to obviate the foregoing and other disadvantages.

A specific object of the invention is to provide an improved composition for coloring aggregate material and which further tend to render such materials dustless.

Another object of the invention is to provide an improved process of coloring aggregate materials, whereby the coloring becomes firmly adhered thereto.

A further object of the invention is to provide an improved bodied suspension of coloring matter particularly adapted for coloring solid carbonaceous fuels.

Other objects will in part be obvious and will in part appear hereinafter.

It has now been discovered, according to the invention, that coloring matter may be more effectively adhered to aggregate materials, such as coal, coke, charcoal, briquettes, crushed rock and the like by applying thereto a coloring matter suspended or dispersed in an aqueous medium by means of a sulfonation product of hydroxylated fatty acids and more particularly the sulfonated hydroxylated fish oil fatty acids.

The invention accordingly comprises the several steps and relation of one or more of such steps with respect to each of the others, and a composition of matter possessing the characteristics, properties and relation of components, all of which will be exemplified in the following detailed disclosure, and the scope of the invention will be indicated in the claims.

In the preparation of the composition of the invention, sulfonated hydroxylated fish oil fatty acids are warmed and a coloring matter in pulverant form is admixed therewith and stirred until a uniform homogenous paste results, which may then be suspended or dispersed in a hot aqueous medium.

The sulfonated hydroxylated fatty acids may be prepared in any suitable manner, it being preferred, however, to produce them in accordance with the following procedure: fish oil fatty acids (by-products from the refining and/or vitamin extraction of fish or fish liver oils), or other unsaturated fatty acids, are sulfonated with sulfuric acid at about 30° C., after which they are thrown into boiling water and boiled until the $SO_3$ group is split off leaving a hydroxyl group in its place. The resulting hydroxylated product is again sulfonated to produce the dispersing and binding agent employed in the composition of the invention. For the starting materials in the above process, any suitable fish or fish liver oil obtained from tuna, cod, halibut, shark, pollock, menhaden, sardine, herring, salmon and other fish, may be used as well as other unsaturated fatty acids, such as ricinoleic, oleic, linoleic, linolenic, palmitoleic, clupandonic, etc.

Sulfonated hydroxylated fatty acids of the aforementioned type are excellent dispersing agents for coloring matter, particularly pulverant forms of coloring matter, such as pigments, lakes, dyed colloidal matter, etc. These dispersing agents produce a heavy emulsion which is highly advantageous in forming a stable suspension which will not settle out. Moreover, these dispersing agents are characterized by having good adhesive qualities and they remain decidedly tacky even after drying. The tackiness afforded enhances the binding action of the coloring material to the aggregate and also serves to lay dust as well as inhibit its formation.

Any suitable coloring matter in solid pulverant form may be incorporated into the composition of the invention, such as pigments, lakes, comminuted metals, dyed colloidal earths, such as fuller's earth, clay, etc. Suitable pigments, such as chrome green, chrome orange, chrome yellow, zinc oxide, litharge, red lead, iron oxide, Venetian red, burnt sienna, Indian red, ultra marine blue, etc. may be used, as well as metal powders of copper, tin, aluminum, bronze, etc.

The aqueous suspension of the invention may be applied to the solid carbonaceous fuel or other aggregate in any suitable manner as by spraying, or by immersing the aggregate in a bath containing the suspension or in any other appropriate manner.

For a fuller understanding of the nature and objects of the invention, reference should be had to the following examples which are given merely to illustrate further the invention and are not to be construed in a limiting sense:

Example I

Five parts of sulfonated hydroxylated fish fatty acids are warmed to about 60° or 70° C and 3 parts of chrome green and 2 parts of a pigment sold under the trade-name of Asbestine are intimately admixed to form a homogenous mass. The resulting paste is then dispersed in 200 parts of boiling water to form a stable dispersion or suspension which may be directly sprayed (preferably warm or hot) on to coal or other aggregate.

Example II

Five parts of finely divided aluminum are uniformly admixed with 5 parts of sulfonated hydroxylated oleic acid and formed into a paste which is suspended in 200 parts of boiling water. The aggregate to be colored is immersed in the hot suspension for 5 minutes, withdrawn and dried.

Carbonaceous fuels and other mineral aggregates treated according to the invention retain their coloring indefinitely, thereby effecting a permanent form of identification. Moreover, the tackiness of the dispersing agent which effectively binds the coloring matter to the aggregate, serves a dual function in laying dust.

If desired, other substances may be included in the composition of the invention, such as animal, vegetable or mineral oils or waxes, fatty acids, soaps, degraded glycerides of the higher fatty acids, fatty amines, fatty amides, fatty ketones, fatty ethers, etc.

Since certain changes in carrying out the above process and certain modifications in the composition which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that if desired, other materials may be added to our novel composition of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. A solid carbonaceous fuel bearing a coating comprising a coloring matter and a sulfonated hydroxylated fish oil fatty acid.

2. A process for coloring mineral aggregates which comprises applying thereto an aqueous suspension of a coloring matter, said suspension containing a sulfonation product of a hydroxylated fish oil fatty acid.

3. A process for coloring solid carbonaceous fuels which comprises applying thereto an aqueous suspension of a pulverized coloring matter, said suspension containing a sulfonation product of a hydroxylated fish oil fatty acid.

4. A process for coloring coal which comprises applying thereto an aqueous suspension of a pigment, said suspension containing a sulfonated hydroxylated fish oil fatty acid.

5. A process for coloring coal which comprises applying thereto an aqueous suspension of a metal powder, said suspension containing a sulfonated hydroxylated fish oil fatty acid.

6. A composition for coloring mineral aggregates comprising an aqueous suspension of a coloring matter, said suspension containing a sulfonated hydroxylated fish oil fatty acid.

7. A composition for coloring mineral aggregates comprising an aqueous suspension of a pigment, said suspension containing a sulfonated hydroxylated fish oil fatty acid.

8. A composition for coloring mineral aggregates comprising an aqueous suspension of a dyed colloidal matter, said suspension containing a sulfonated hydroxylated fish oil fatty acid.

9. A composition for coloring mineral aggregates comprising an aqueous suspension of a metal powder, said suspension containing a sulfonated hydroxylated fish oil fatty acid.

10. A solid carbonaceous fuel bearing a coating comprising a coloring matter and a sulfonated hydroxylated fatty acid.

11. A solid carbonaceous fuel bearing a coating comprising a pigment and sulfonated hydroxylated fish oil fatty acids.

12. A solid carbonaceous fuel bearing a coating comprising a metal powder and sulfonated hydroxylated fish oil fatty acids.

13. A solid carbonaceous fuel bearing a coating comprising a dyed colloidal matter and sulfonated hydroxylated fish oil fatty acids.

THOMAS F. GROLL, Jr.
GEORGE H. SMALL.